June 3, 1969 E. LAIMINS 3,448,424
SHEAR-RESPONSIVE FORCE TRANSDUCERS
Filed Jan. 17, 1967 Sheet 1 of 4
FIG. 1
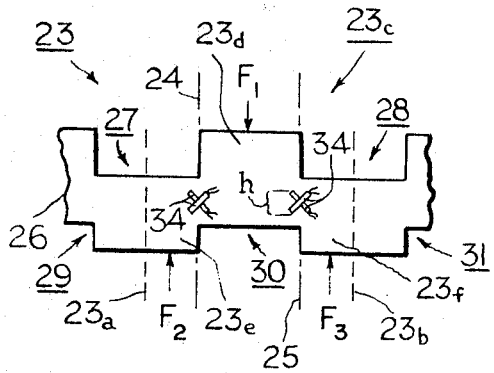
FIG. 2
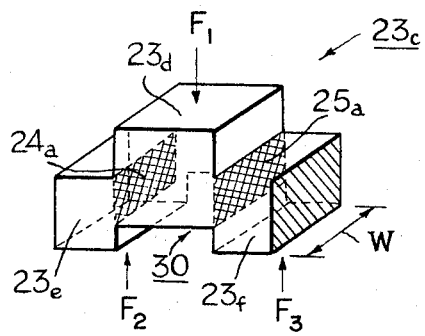
FIG. 3
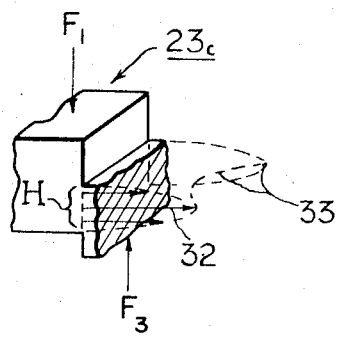
FIG. 4
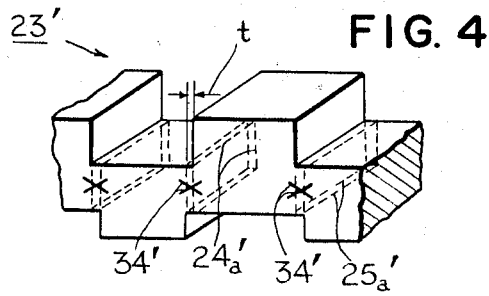
FIG. 5
FIG. 6
FIG. 7
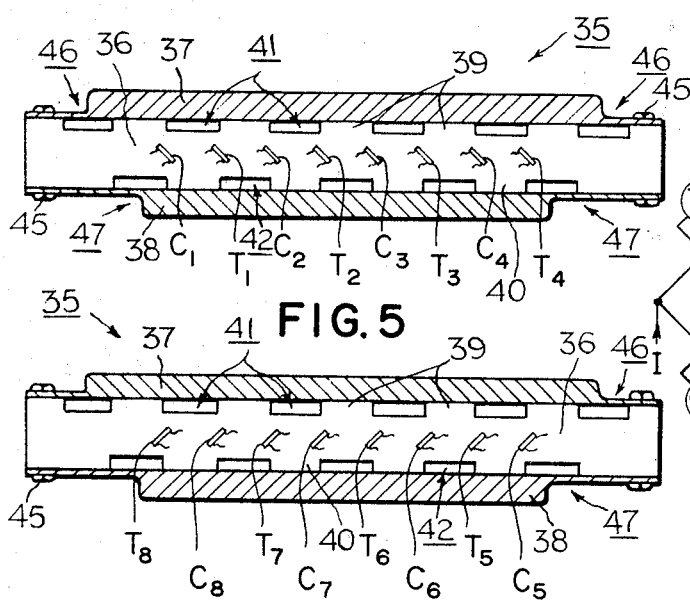
INVENTOR.
ERIC LAIMINS
BY
Thomson & Mrose
ATTORNEYS

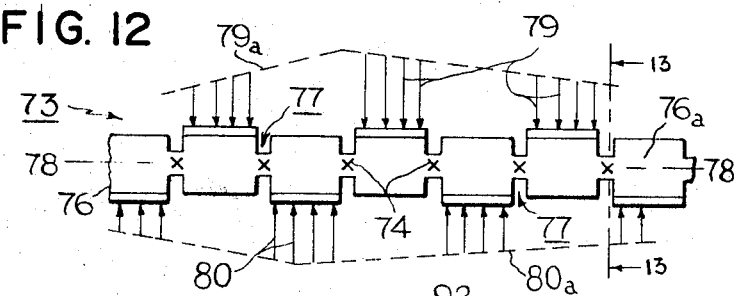
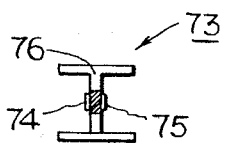
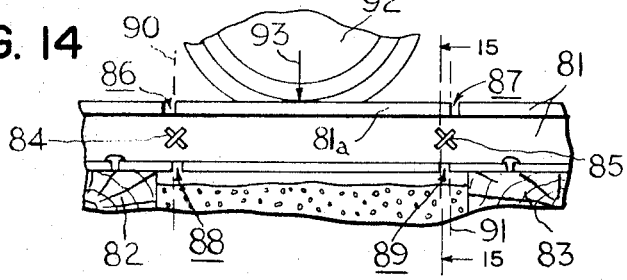
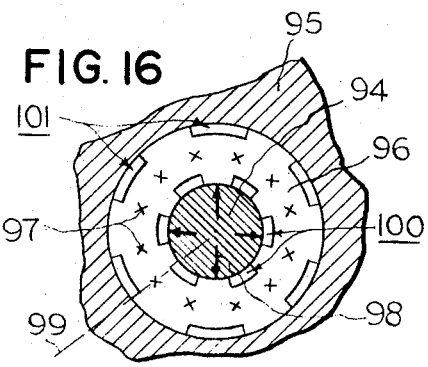
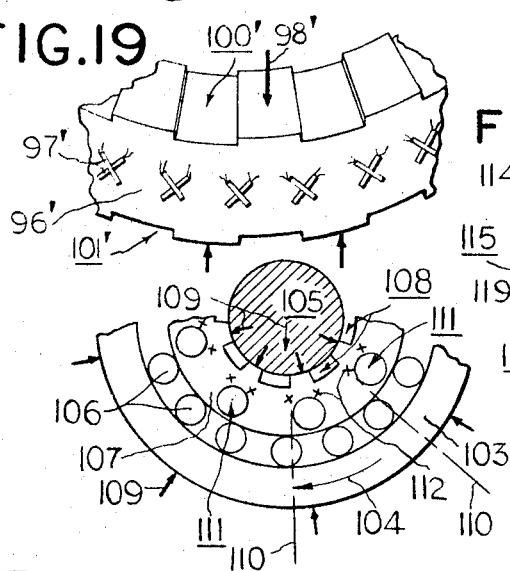
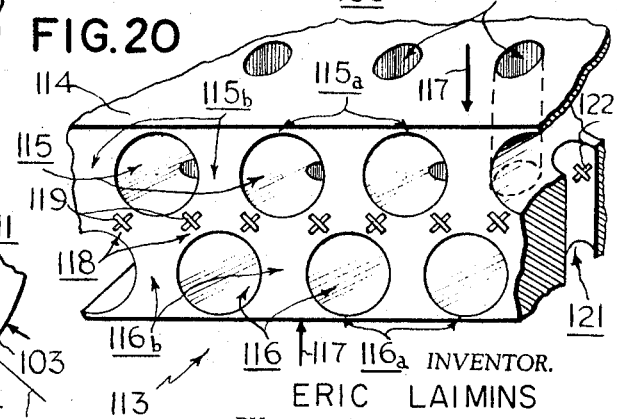
INVENTOR.
ERIC LAIMINS
BY
Thomson & Mrose
ATTORNEYS June 3, 1969     E. LAIMINS     3,448,424
SHEAR-RESPONSIVE FORCE TRANSDUCERS
Filed Jan. 17, 1967     Sheet 4 of 4
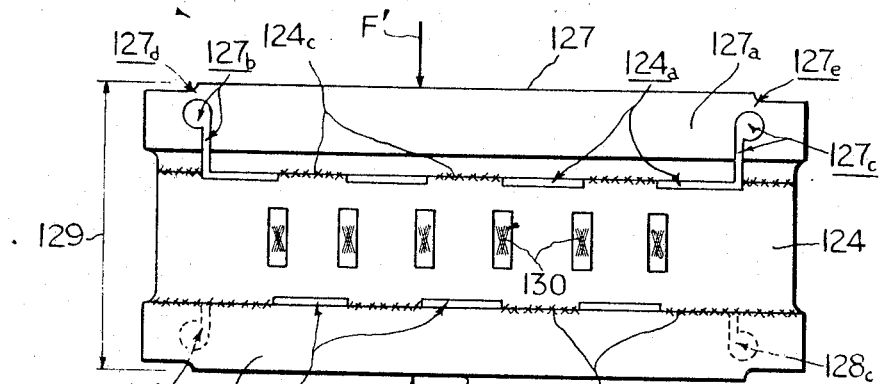
FIG. 21
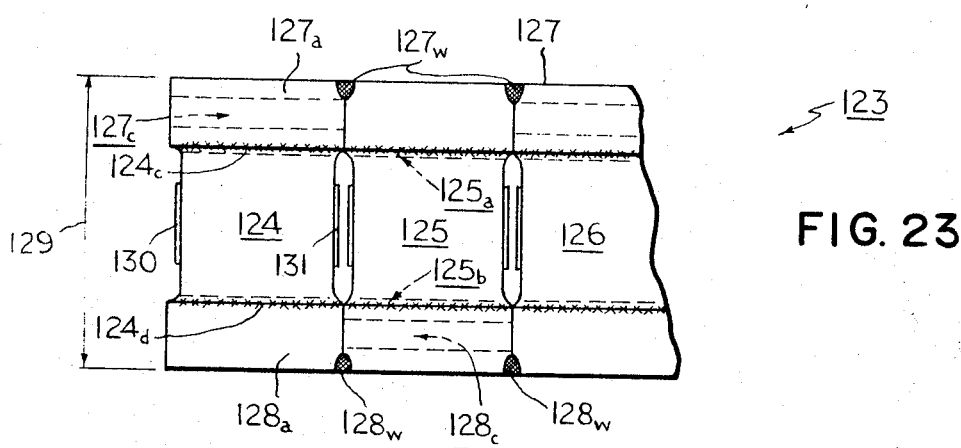
FIG. 22
FIG. 23
INVENTOR.
ERIC LAIMINS
BY
Thomson & Mrose
ATTORNEYS

United States Patent Office 3,448,424
Patented June 3, 1969

3,448,424
SHEAR-RESPONSIVE FORCE TRANSDUCERS
Eric Laimins, Belmont, Mass., assignor to BLH Electronics, Inc., Waltham, Mass., a corporation of Delaware
Filed Jan. 17, 1967, Ser. No. 609,872
Int. Cl. G01l 1/22
U.S. Cl. 338—5                                   23 Claims

ABSTRACT OF THE DISCLOSURE

Force-responsive transducers in which substantially pure shear effects cause force-related electrical signals to be produced via associated strain gages are formed by relatively stiff force-transmitting elements of bifurcated but essentially monolithic construction.

Background of the invention

The present invention relates to improvements in force-responsive transducers of the strain-gage type, and, in one particular aspect, to novel and improved apparatus of advantageously economical, rugged, and miniaturized construction wherein a plurality of low-height integral bifurcated force-transmitting elements uniquely develop substantially pure shear effects at discrete measurement sites conveniently accommodating bonded electrical strain gage elements for precise translations and integrations of large and rapid varying applied forces without appreciable attendant deflections and spurious responses to forces other than those in a predetermined direction.

It has long been well known to measure elastic strains resulting from loading-induced stresses of elements such as beams, columns, diaphragms, and the like, using electrical strain gages for the accurate translations of the exhibited strains into convenient related variations in electrical impedances. Wire, foil and semiconductor type gages have found widespread application in such devices, and well lend themselves to manufacture in highly miniaturized forms suitable for installation upon small surface areas of sensing elements. For some purposes, it is desirable to obviate the need for the relatively large deflections which are usually involved in the generation of surface strains which can be measured readily, and, in addition, to eliminate the error-inducing responses of bending-type elements to those forces which are either not in the direction of interest or not effective at the same positions under different measurement conditions; in this connection, it has been found highly advantageous to utilize, instead, certain of the beneficial effects of shear phenomena. To this end, transducers such as those which are intended to respond to diaphragm forces have been devised in a variety of configurations, for example. One of the hitherto unsatisfactorily resolved force-measuring problems has involved what may be termed "broad-area" measurement environments, wherein the applied forces are very large and may be either spread uniformly over a loading surface or may be unevenly distributed or concentrated at various positions; in such instances, it can be important to achieve an accurate integration or, alternatively, to characterize the "profile" of such forces, and to do so with precision equipment which will not require unduly large, resilient, or complex transducer installations.

Summary

In accordance with certain of the aspects of the present invention, it is recognized that unusually precise and reliable shear-responsive transducers capable of accepting even extremely high and variable loadings without significant deflection may be expressed by way of advantageously simple and rugged "monolithic" units having desirably small height in the loading directions and lending themselves to low-cost fabrication in convenient structural shapes. A fundamental building-block element of the improved transducers, which may share certain of its features with integral portions of other cooperating elements, is in what is essentially a bifurcated force-transmitting form, the relatively stiff legs of which are integral with a similarly stiff common stem and develop shear effects along what is substantially a plane of shear, or at least a relatively thin shear section, at each of the integral junctions between the legs and stem. In a side-by-side integral array of such elements, there results an elongated unit which in important respects resembles a conventional structural member and may be loaded and used as a support in the manner of a simple one-piece block, or the like. Such common members as bars and I-beams well lend themselves to inexpensive machined adaptation as multiple-element transducers when appropriately fitted with strain gages at the sites of expected shear concentrations at spaced positions along the lengths thereof.

Accordingly, it is one of the objects of the present invention to provide novel and improved strain-gage transducers in which applied forces are translated into highly concentrated related shear phenomena at the sites of substantially zero-thickness shear sections.

Another object is to provide unique low-height force-responsive transducers in which substantially stiff bifurcated elements develop narrowly localized shear effects which are accurately measurable at convenient exposed surface locations.

A further object is to provide new and advantageous integrated multielement shear-responsive transducers of rugged low-cost construction which will precisely measure forces effective in a predetermined direction irrespective of their location within a broad area.

Still further, it is an object to provide elongated force transducers of an integrated construction and noncomplex cross-section which are equipped with surface strain gages at a plurality of distributed sites exhibiting concentrated shear strains as the result of unique mechanically controlled force-transmission paths.

In one practice of these teachings, an elongated bar member of stiff but nevertheless somewhat elastic metal and of substantially rectangular cross-section is transversely slotted along the top and bottom at regularly spaced positions, the slots being relatively shallow and of about the same width as the intervening unslotted portions, and the slots at the top and bottom being fully offset or staggered in relation to one another. Strain gages are bonded along one or both sides of the member, with substantially a 45° angle of inclination in relation to the axis of elongation of that member, and crossing those successive sites along the length of the member where the offset top and bottom slots confront one another. The gaged slotted member is sandwiched between broad-area load-applying members, and the gages thereof are electrically excited and coupled with output indicating equipment to characterize total loading or the profile of loading forces, as desired.

Although the features of this invention which are considered to be novel are set forth in the appended claims, further details as to preferred practices and as to the further objects and advantages thereof may be most readily comprehended through reference to the following description taken in connection with the acompanying drawings.

*Brief description of the drawings*

FIGURE 1 illustrates, from the side, a fragment of an improved multielement shear-type force transducer, together with force, shear-plane, and element designations;

FIGURE 2 represents an element of the transducer of FIGURE 1 pictorially, together with a distinctive cross-hatching of its thin shear sections;

FIGURE 3 portrays a fragment of the same transducer element in association with a shear diagram for one of the shear sections;

FIGURE 4 depicts a portion of a similar transducer wherein the shear sections are characterized by dashed linework and possess a finite yet minute thickness facilitating fabrication;

FIGURE 5 is a cross-section of an elongated gaged shear transducer member and associated load-applying members provided with flexures;

FIGURE 6 is a cross-section of the assembly of FIGURE 5 as viewed from the opposite side to display gage orientations there;

FIGURE 7 is a schematic diagram characterizing suitable bridge-circuit interconnections for the gages of the assembly of FIGURES 5 and 6;

FIGURE 12 is a side view of another multielement I-beam shear transducer, with nonuniform loading forces;

FIGURE 13 is a cross-section taken along section line 13—13 in FIGURE 12;

FIGURE 14 shows a track-type shear transducer for the weighing of wheel-supported loads;

FIGURE 15 is a cross-section taken along section lines 15—15 in FIGURE 14;

FIGURE 16 represents a sleeve-bearing type shear transducer installation;

FIGURE 17 represents a stationary-shaft roller-bearing type shear transducer installation;

FIGURE 18 represents a rotating-shaft roller-bearing type shear transducer installation;

FIGURE 19 illustrates a portion of an elongated transducer unit having another direction of curvature;

FIGURE 20 portrays a fragment of a multielement broad-area shear-type transducer wherein circularly machined openings aid in developing the desired force-transmitting portions;

FIGURE 21 presents a side view of a broad-area shear-type weighing transducer assembly having load-applying members which include flexures;

FIGURE 22 is a plan view of the assembly of FIGURE 20;

FIGURE 23 depicts the assembly of FIGURES 20 and 21 from the side.

*Description of the preferred embodiments*

Figure 8:
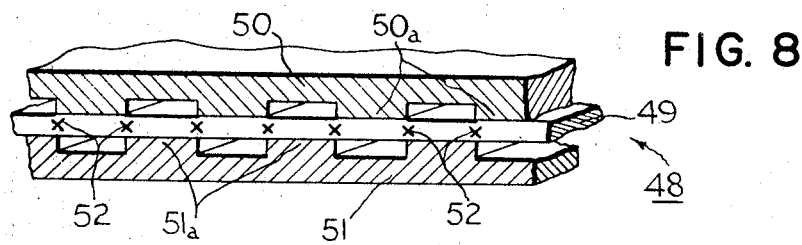
FIGURE 8 illustrates in cross-section an alternative transducer construction which is the composite of a bar-like element and associated slotted elements.

The transducer arrangement 23 appearing in FIGURE 1 includes between dashed lines $23_a$ and $23_b$, as an element $23_c$ thereof (FIGURE 2), an essentially bifurcated structure having a stem portion $23_d$ and a pair of spaced leg portions $23_e$ and $23_f$ which are integral with the stem on opposite sides at the sites of planes 24 and 25 (FIGURE 1) and along the doubly cross-hatched section areas $24_a$ and $25_a$ (FIGURE 2). Each of the portions $23_d$–$23_f$ is of rectangular parallelopiped form, and, all of these portions are of the same width corresponding to that of the bar stock 26 of which they are integral parts. Conveniently, these portions result from simple machining of shallow recesses, such as slots 27–31 along the top and bottom of the bar which originally possessed a uniform rectangular cross-section. Importantly, such forming leaves the top surfaces of stem $23_d$ at a higher level than the legs $23_e$ and $23_f$, and the lower surfaces of the latter likewise are caused to extend below the stem. When these surfaces are arranged to receive all the forces of loading of the element, such as the forces $F_1$, $F_2$ and $F_3$, substantially pure shear effects are developed at the sites of planes 24 and 25 and across the related shear sections $24_a$ and $25_a$, this being the result of the facts that the contiguous stem and leg portions do not overlap appreciably in direction transversely to the directions of the loading forces, nor are they so offset laterally that the junctures between the stem and leg portions will undergo significant flexure or bending. Theory dictates that optimum shearing will occur when the lateral ends of the staggered top and bottom slots are in alignment in the direction of the intended loading forces, as illustrated. Shear stress magnitudes 32 are peaked at a maximum about midway along the height H (FIGURE 3) of each shear section, and are advantageously larger at the side surfaces than elsewhere, as characterized by dashed linework envelope 33 for the shear stresses. Accordingly the shear-sensing strain gages 34 (FIGURE 1) are disposed along such side surfaces, at the sites of the shear section edges, and have their tension- and compression-sensing axes oriented at substantially 45° relationships to the intended direction of the applied forces and, hence, to the axis of elongation of the bar 26. Either single or double (as shown) gages may be used at the gaging positions. In any given installation where the height $h$ (FIGURE 1) of the inclined gage or gages is preestablished, the height H (FIGURE 3) of the shear sections is made significantly greater, such that the gages will respond more nearly to the peak shear rather than merely to the average shear. Gage outputs are a function of the areas of shear sections $24_a$ and $25_a$, with outputs increasing as these areas are decreased; accordingly, the bar width W (FIGURE 2) is preferably narrow, consistent with the need for strength which will withstand the maximum loading without involving permanent deformations. All of the bar material (example: steel) forming the integral stem and leg portions has a desirable degree of elasticity; however, the proportions of the stem and leg portions are such that they are substantially rigid and will not bend under the loading, leaving the principal elastic deformations as those of shear at the shear sections. Element $23_c$ is but one of a number of such side-by-side elements integral with one another in the multielement transducer 23, and it should be recognized that what have been referred to as stem and leg portions, respectively, for the element $23_c$ may also be considered to serve in part as leg and stem portions, respectively, of the adjoining elements, which are in inverted relationships. A similar multielement shear transducer 23′, in FIGURE 4, is shown to have shear sections 24$_a$′ and 25$_a$′ of finite but minute thickness $t$, which tends to render the lateral placements of its gages 34′ less critical; nevertheless, these sections are not so thick as to respond to the loading in significant flexure or bending rather than in substantially pure shear. Unlike those devices which rely upon bending phenomena, the improved devices advantageously do not involve a critical location of gages in relation to a neutral bending axis, and, a single gage may be relied upon at each shear site inasmuch as certain compensations usually provided by plural gages are not required. However, the aforementioned high $H/h$ ratio is important for the peaking of outputs, and, moreover, the gages should be centered (as shown) to be far enough removed from any sharp corners of the slots (27–31) to avoid spurious stress concentrations likely to appear at these corners.

The transducer assembly 35 appearing in FIGURES 5 and 6 includes at least one bar-type slotted transducer unit 36 sandwiched between substantially stiff upper and lower loading blocks 37 and 38. The latter blocks insure that loading forces, even though not located symmetrically or distributed uniformly, will be well distributed among the upper raised portions 39 and lower raised portions 40 of the transducer 36. Slots 41 and 42 need only be shallow enough to prevent those surfaces intermediate the raised portions from receiving direct loading from the blocks. As illustrated, the leading and trailing edges of the staggered top and bottom raised portions are substantially in an alignment which will promote optimum shearing phenomena substantially along planes aligned with the direction of the loading forces. Transducer 36 comprises an integrally joined array of shear-sensing elements having characteristics like those referred to above in considering FIGURES 1–4, and has conventional strain gages $C_1$–$C_8$ and $T_1$–$T_8$ at the sensing sites on both sides of the slotted bar member. The letterings C and T suggest the intended gage responses in compression C and tension T under conditions of compressive loading tending to press together the loading blocks of the sandwiched assembly. These gages may of course be oriented differently, such that either a response in compression or tension may be realized at each of the gage sites. For the illustrated symmetrical orientations of these gages, an appropriate bridge-circuit arrangement 43 is presented in FIGURE 7. Output device 44, of a conventional type, there responds in an optimum manner to the shear effects sensed by the surface gages $C_1$–$C_8$ and $T_1$–$T_8$. Such gages may be of conventional wire, foil or semiconductor types, for example, and exhibit resistance changes causing related electrical balance changes in the bridge circuit which is electrically excited via its input couplings I—I. All of the gages contribute their shear- and force-related impedance changes to the bridge operation, and the output thus represents a true integration of the total loading over the load block areas. Where a larger loading area is desired, as in certain types of weighing systems, a number of relatively narrow elongated transducers such as transducer 36 may be arrayed side-by-side, between the loading blocks 37 and 38, and their strain-gage outputs may be combined. Transducer portions 39 and 40 are preferably held securely in relation to the adjoining loading blocks, and fasteners 45 conveniently attach these blocks to the essentially passive unslotted ends of the transducer bar. Unwanted shunting or by-passing of the loading forces is avoided by reducing the thickness of the loading blocks at end positions such as 46 and 47, and above certain of the bar slots, where flexures are thus produced. Substantially all of the loading must therefore be directed through the shear-responsive measurement sections of the transducer, where they will be integrated into the measurement outputs.

Figure 9:
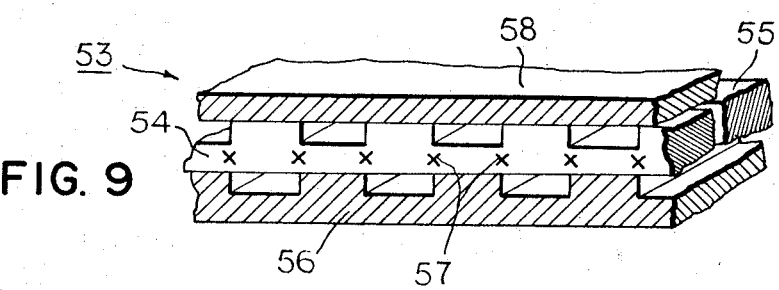
FIGURE 9 provides a cross-section of a further alternative transducer construction involving slotted and plate-like elements.

Transducer 48 in FIGURE 8 involves a three-part construction wherein shearing effects are experienced by a flat bar element 49 sandwiched between two similar ribbed members 50 and 51 which have their respective inwardly-directed ribs 50$_a$ and 51$_a$ offset or staggered to cause the loading forces to act on intermediate element 49 only in the manner developing substantially pure shear at the sites of the gages 52. Other elements similar to element 49 may be incorporated into the assembly, and the shallow ribs 50$_a$ and 51$_a$ will serve to promote the desired shear phenomena in all of such elements. The slots separating such ribs may be relatively shallow and the members 50 and 51 may be sufficiently thick to act also as stiff load-distributing blocks. All of the metal parts of the assembly may be integrated by welding, brazing, or the like, in the illustrated relationships. The three-layer construction 53 in FIGURE 9 represents an alternative wherein the intermediate bar elements 54 and 55 are raised or ribbed on one side only, the common lower member 56 being similarly ribbed and offset such that the desired shear effects are exhibited at the sites of the plural spaced side gages 57. Upper member 58 need only be plate-like, and both it and the lower member 56 may be dimensioned to serve as rigid load-distributing blocks. All of the intermediate shear-responsive elements are gaged, preferably on both sides.

Figure 10:
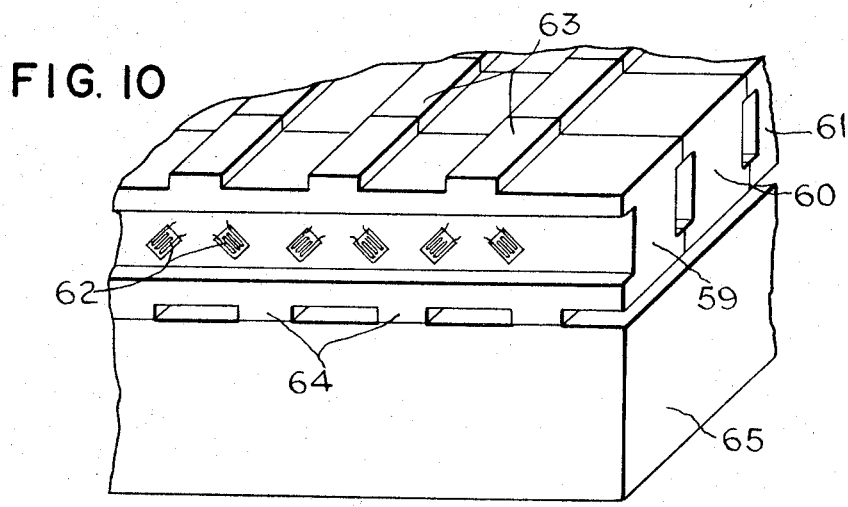
FIGURE 10 depicts a portion of a broad-area weighing transducer assembly including transducer units of I-beam form, the top loading block being removed to expose constructional details.

The broad-area force-measuring apparatus portrayed in FIGURE 10 includes a plurality of like elongated side-by-side shear-transducer bars, but three of which, 59–61, are present in the fragmentary showing. The compactly-arranged bars are each relieved along both sides, to accommodate shear-sensing gages, such as the gages 62 and associated wiring, without mechanical interference, as the result of which each of the bars has substantially an I-beam configuration. Raised portions or ribs 63 and 64 on the top and bottom are in the offset relationship required to promote the desired shear effects. Unevenly-distributed or unsymmetrically concentrated loading forces are caused to be shared among and integrated by the gaging of the multiple transducer elements as a consequence of the load-distributing effects of thick and rigid upper and lower blocks, only the lower one of which, 65, is portrayed in the drawing. Gage filaments are shown to be oriented in substantially a 45° relationship to the loading direction.

Figure 11:
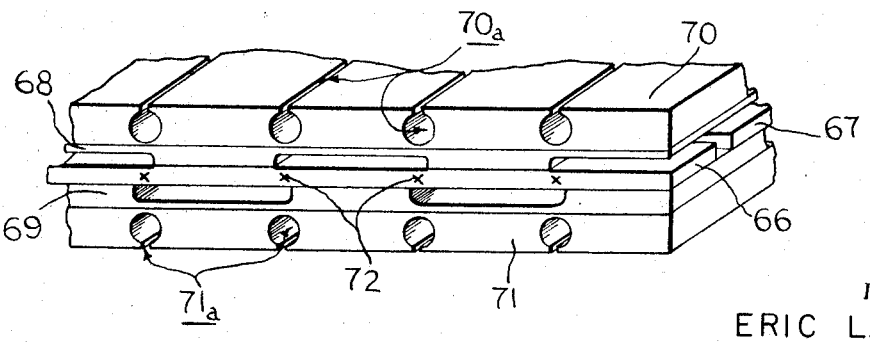
FIGURE 11 illustrates a broad-area transducer assembly generally like that of FIGURE 8 and including load-applying members having multiple flexures which serve load-distribution purposes.

Loading block structures need not in all cases be highly stiff, and, in some instances, may advantageously be formed so as to yield and thereby compensate for non-uniform loads and uneven supporting surfaces. The latter type of block formations are represented in FIGURE 11, wherein gaged shear-responsive strips 66, 67 are disposed between offset ribbed plates 68 and 69, and wherein the load blocks 70 and 71 are preferably of a highly elastic yieldable material such as rubber. A certain degree of flexure may be permitted to appear in strips 66 and 67, at the gaging sites 72, due to relatively thick shear sections, and the ribbed plates 68 and 69 are also somewhat flexible where slotted. Flexures are also promoted in the load blocks by the transverse slottings 70$_a$ and 71$_a$, such that the entire assembly is in the nature of a somewhat flexible weighing mat.

Although integration of forces is important in many transducer applications, there are other situations in which it is specifically sought to measure variable force or pressure profiles, such as those along the lengths of extrusion rolls in metal and paper industries. Some of these rolls may be as much as twenty feet or so in length, and the force distributions must be determined with great accuracy for purposes of controlling the qualities of the products processed by the rolls. Transducer 73 in FIGURES 12 and 13 serves such needs in a simple and effective fashion by way of the numerous distributed closely spaced gages 74 and 75 on both sides of the modified I-beam member 76. Unique shear-sensing elements are formed by relieving or entirely removing (as shown) alternate upper and lower cross portions of the beam member at successive positions along its length, and further material removals may form slots 77 which reduce the height of the web 76ₐ at the gaging sites. Unwanted responses to bending are compensated through use of crossed gages centered substantially along the neutral axis 78—78. The beam-transducer unit may be loaded between the raised top and bottom surfaces by way of engagements with separate loading elements or directly with the members whose loading force profiles are to be measured. Arrows 79 and 80 and the dashed linework 79ₐ and 80ₐ characterize the type of loading conditions which may be encountered, and it will be evident that the plurality of gages will permit localized loadings to be evaluated on an incremental basis throughout the length of the transducer.

An I-beam type rail transducer member 81 is used similarly in the arrangement of FIGURES 14 and 15, where one portion of the rail, suspended between two ties 82 and 83, develops the desired shear effects at the sites 84 and 85 of crossed gages. Such shear effects are localized and rendered substantially free of bending influences by narrow slotting of the upper and lower cross portions of the rail at the positions 86–89; optimized shearing results when the slotting leaves the ends of crown 81ₐ in substantially vertical alignment with the outermost ends of the lower cross portions of the rail, as signified by the dashed linework 90 and 91. Wheel 92 applies loading force 93 to the transducer section, and may be associated with a load-carrying vehicle the total weight or loading of which is to be determined by a plurality of such transducers. Although the wheel 92 is represented in a centered location upon the measurement section of the rail, this condition is advantageously not a critical one in the improved apparatus.

A sleeve-bearing transducer arrangement is illustrated in FIGURE 16, wherein the relatively rotatable shaft 94 and support 95 are separated by a gaged annular bearing unit 96 having a plurality of side gages 97 distributed on one or both sides at predetermined angular positions where substantially pure shear effects are developed. These effects, which characterize the loading forces 98, are exhibited in radial directions, such as the direction of linework 99, where ends of offset inner and outer peripheral slots 100 and 101, respectively, are substantially in radial alignment. Forces in the bearing unit are caused to be distributed in the desired manner by the peripheral slotting, and the output information from the gages 97 may be taken cumulatively to indicate the total or integrated loading, or, alternatively, may be taken from each angular position to characterize the circular profile of loading forces. Similar measurements are obtainable with the roller-bearing transducer structure in FIGURE 17, the outer raceway 103 there being rotatable, as designated by arrow 104. Shaft 105 is separated from the spherical, cylindrical or like rollers 106 by an annular transducer unit 107 which has a plurality of slots 108 along its inner periphery but is permitted to serve as an inner raceway by having its outer periphery uninterrupted. In lieu of surface interrupting slots there, for the needed distribution of loading forces 109 in a manner promoting desired shear in the radial directions 110, the unit 107 is provided with transverse openings 111 at radial positions intermediate those of inner peripheral slots 108. Openings 111 are sufficiently wide, angularly, to span substantially the arcuate separations between edges of the inner slots, and thus channel the loading forces in directions where shear is predominant along the radial positions at which the side gages 112 are mounted. The roller-bearing assembly in FIGURE 18 is generally similar, except that the transducer 107' is slotted on the exterior and has its inner periphery uninterrupted for purposes of accommodating the actions of rollers 106'. Reference characters applied to the drawing of this embodiment are the same as those for items having comparable functions and significance in the arrangement of FIGURE 17, with distinguishing single-prime accents being applied; the operating characteristics of these two embodiments will be recognized as having common aspects and the matter is thus not further elaborated upon here. Transducers of these types obviously may be gainfully exploited in a variety of force-measurement installations involving relatively rotatable parts, such as axles of wheeled vehicles, and power-transmitting shafts.

The transducer unit appearing in a partial showing in FIGURE 19 likewise involves a curvature, such as the illustrated circular curvature, of its axis of elongation, except that its annular element 96' has its gages 97' distributed along the outer and inner (not visible) cylindrical peripheries where they cross edges of thin radially-disposed shear-sensing sections resulting from the cooperative effects of edge-aligned offset radially disposed slotting 100' and 101' along the top and bottom surfaces. Response is to loading forces 98' in the axial direction.

It has been seen, in connection with the embodiments of FIGURES 17 and 18, that transverse openings, rather than recesses or slots along top and bottom surfaces of a transducer can serve to channel the loading forces in the prescribed directions which will induce highly peaked related shearing effects at positions convenient for surface-gaging. Transducer 113 in FIGURE 20 exploits this technique. The base material for this unit comprises a substantially flat low-height bar or slab 114 of somewhat elastic material, such as steel, which has been drilled or otherwise machined to have openings extending transversely to the intended loading direction in a predetermined pattern. These laterally spaced openings 115 and 116 are in two parallel rows, and are offset from one another, as shown. Upper openings 115 are at least close enough to the top surface of slab 114 to leave only thin and thus somewhat flexible sections 115ₐ between the stiff larger sections 115ᵦ appearing between the successive spaced openings. Sections 115ᵦ thus are essentially separated from one another along the top surface, as though they were raised sections. Similarly, the lower openings 116 are at least close enough to the bottom surface of the slab to define thin flexible sections 116ₐ between the stiff larger sections 116ᵦ, and the latter sections function essentially as though they are separated downwardly projecting legs. Arrows 117 characterize the direction of compressive forces which produce a high degree of shearing in the shear sections 118 appearing between the adjacent holes in the two rows; desired dimensions for these shear sections may be established by the selected spacings and proportionings of these holes, and adequate height is provided at the gaging sites to accommodate surface gages such as the illustrated crossed gages 119. Access may also be had to the shear sections, for gaging purposes, by way of other openings 120 and 121, inwardly from either or both of the top and bottom surfaces of the slab; in this manner, one may avoid the need to separate the slab into narrower strips as an accommodation for gaging at the numerous positions required for accurate integration of the shear-responses to the measured forces. Gage unit 122 characterizes one such gage installation within the further openings; gage wiring will be accommodated by any of the openings and can be conveniently run to associated external circuitry. Accessory loading blocks (not shown) are used to improve the force distributions throughout the transducer structure.

FIGURES 21–23 portray a preferred embodiment of a multiple shear-bear transducer 123 in which each of the beams such as the beams 124–126 comprises a plurality of integral side-by-side shear cell elements, and in which the beams are integrated with one another and with rigid upper and lower load-distribution covers 127 and 128. In a typical construction designed to accept a 3,500,000 lb. compression loading F', which may be unevenly distributed or nonsymmetrically concentrated, the entire transducer sandwich has a relatively low overall height 129 of but about four inches, and a ten-inch by ten-inch square configuration; a total of four multi-element beams is used in a compact side-by-side arrangement best characterized in FIGURE 23. As a convenience in manufacture, each of the beams, such as beam 124, is initially of substantially rectangular cross-section, and has the offset transverse spaced slottings 124$_a$ and 124$_b$ along the top and bottom formed by a simple machining operation. Subsequently, the beam is securely brazed and/or welded, along the projecting top and bottom surfaces 124$_c$ and 124$_d$ as designated by X-linework, in integrated relation to the associated slightly-wider cover-element portions 127$_a$ and 128$_a$. Crossed gages 130 and 131 are applied at the shear sites on both sides. Importantly, rigid cover portion 127$_a$ is transversely drilled and slotted, at the illustrated locations 127$_b$ and 127$_c$ near its narrower ends, the drilled openings being near enough to the top surfaces to form flexures at end sites 127$_d$ and 127$_e$ near where that cover portion is joined with ends of beam 124. These openings and merged slots in turn merge with the proximate end slots along the top of the beam 124, such that substantially all of the top loading on top of cover element 127$_a$ will be transmitted through beam 124 only by way of its three centered upwardly projecting portions 124$_e$, the end portions being essentially passive and bypassed. The ends of the cover element are also preferably somewhat reduced in height outwardly beyond the flexures, as shown in FIGURE 21, to avoid unintended loadings there which could be shunted through the end portions of the beam without being sensed by the gages. Lower cover element 128$_a$ need not be, and is not, provided with the slotting and flexures, because those on the top suffice to force all the loading through the beam 124 in the intended paths creating the desired shear effects. For optimum integrations, the side-by-side beams, such as beams 124 and 125 are in an inverted relation to one another; that is, the beam 125 has drilled openings and slots 128$_b$ and 128$_c$ at the bottom, rather than the top, forming the cover flexures for that beam's loading cover at the bottom. In addition the top and bottom slottings 125$_a$ and 125$_b$ for beam 125 are of a pattern inverted in relation to that for beam 124, such that the respective beam slottings and projecting portions are offset (FIGURE 22) and thus provide a stronger structure which promotes accurate measurement integration of loadings. Adjacent elongated portions of the covers 127 and 128, which are initially separate during an early stage of manufacture, are subsequently made integral with one another as by the welding at sites 127$_w$ and 128$_w$, such that the entire structure is then substantially monolithic in character. The gages for the shear elements of the beams may be interconnected to produce cumulative effects.

In other constructions, the transducer apparatus may be arranged to respond to forces in tension, or tension and compression, and the gaging may exploit known techniques for introducing compensations. Accordingly, it should be understood that the specific preferred embodiments and practices which have been depicted and described herein have been presented by way of disclosure rather than limitation, and those skilled in the art will appreciate that various modifications, combinations and substitutions may be effected without departure from the scope of this invention in its broader aspects and as set forth in the accompanying claims.

What I claim as new and desire to secure by Letters Patent of the United States is:

1. Shear-responsive force transducer apparatus comprising a substantially rigid and solid mass of material having a high modulus of elasticity and a substantially uniform cross-section transversely to a direction of elongation thereof, means for applying load forces to said mass in opposite substantially parallel directions and transversely to said direction of elongation and in concentrations at different positions therealong which are respectively offset in relation to each of a plurality of substantially parallel and relatively thin shear sensing portions thereof, said thin shear sensing portions being both transverse to said direction and parallel to said opposite directions, whereby said opposite forces acting in offset relation to said thin shear sensing portion develop substantially pure shear in said portions, and surface strain gages bonded to said mass at sites along side surfaces thereof at which said thin shear portions are exposed and responding to shear effects exhibited at said sites.

2. Shear-responsive force transducer apparatus as set forth in claim 1 wherein said mass has the form of a bar elongated in said direction, wherein said thin shear sensing portions are spaced from one another in said direction and are relatively thin in relation to the spacing therebetween, and wherein the sites at which said shear sensing portions are exposed are of greater dimension in shear directions parallel with said force directions than the expanse in said direction of said strain gages bonded at said sites, whereby said gages respond to substantially peaked shear effects at said sites.

3. Shear-responsive force transducer apparatus as set forth in claim 2 wherein said means for applying load forces comprises substantially rigid load-transmitting portions projecting in said opposite directions in force-transmitting relation to upper and lower portions of said mass, said load-transmitting portions each being of length less than the length of said mass in said direction of elongation, and adjacent ones of said load-transmitting portions on one of said upper and lower portions being spaced apart by a distance substantially equal to the length of the intermediate offset load-transmitting portion on the other of said upper and lower portions of said mass.

4. Shear-responsive force transducer apparatus as set forth in claim 1 wherein said mass comprises an elongated member having a substantially I-shaped cross-section, wherein the upper and lower cross-portions of said I-shaped member are slotted transversely at least through to the membrane portion and edges of upper and lower ones of said slots, in the direction of said elongation, are substantially in alignment in direction parallel with said opposite force directions, whereby loading forces applied in opposite directions to said cross-portions on opposite sides of the aligned slot edges produce concentrated shear effects in the membrane portion therebetween, and wherein said strain gages are bonded to side surfaces of said membrane portion at sites of said alignment and in inclined relationship to said direction of elongation.

5. Shear-responsive force transducer apparatus as set forth in claim 4 wherein the slottings through said upper and lower cross-portions of said I-shaped member are of length, in the direction of said elongation, substantially the same as the length of the unslotted cross-portions therebetween, and wherein the unslotted upper and lower cross-portions are substantially in alignment with the slottings of the lower and upper cross-portions, respectively, in said direction parallel with said opposite force directions.

6. Shear-responsive force transducer apparatus as set forth in claim 3 wherein said means for applying forces further comprises a pair of substantially rigid members each contiguous with all of said load-transmitting portions associated with one of said upper and lower portions of said mass, said rigid members being in a sandwiching relation to said mass and thereby transmitting substantially all of said load forces to said mass through substantially all of said load-transmitting portions simultaneously, and wherein at least one of said gages is bonded to said mass at a side surface where each of said shear portions is exposed.

7. Shear-responsive force transducer apparatus as set forth in claim 6 wherein said mass comprises a bar member elongated in said direction and having a substantially rectangular cross-section throughout, said load-transmitting portions being integral with said bar member and adjacent ones of said load-transmitting portions being separated on said upper and lower portions of said bar by spaces from which material of said bar has been removed, and wherein said gages are bonded to side surfaces of said bar member at a plurality of said sites at substantially a 45° angle relative to said direction of elongation.

10. Shear-responsive force transducer apparatus as set forth in claim 7 wherein at least some of said adjacent ones of said load-transmitting portions are separated by slots which are relatively shallow in relation to the overall height of said bar member.

9. Shear-responsive force transducer apparatus as set forth in claim 7 wherein at least some of said adjacent ones of said load-transmitting portions are separated by holes extending transversely both to said direction of elongation and to said opposite directions.

10. Shear-responsive force transducer apparatus as set forth in claim 1 wherein said direction of elongation is circular and said mass is annular, wherein said opposite directions are radial, wherein said means for applying load forces comprises substantially rigid load-transmitting portions projecting in said radial directions in force-transmitting relation to inner and outer portions of said annular mass, said load-transmitting portions each being of arcuate length less than that of the associated periphery of said annular mass, and adjacent ones of the inner and outer load-transmitting portions along each of the peripheries being spaced apart angularly by substantially the same angular expanse as that of the intermediate angularly offset load-transmitting portion along the other periphery of said annular mass.

11. Shear-responsive force transducer apparatus as set forth in claim 10 wherein said load-transmitting portions are circularly curved to be contiguous, along inner and outer peripheries of said annular mass, with outer and inner peripheries, respectively, of relatively rotatable members, and wherein said gages are bonded to side surfaces of said annular mass in oblique relation to radii thereof along which said shear portions are exposed.

12. Shear-responsive force transducer apparatus as set forth in claim 11 wherein at least some of adjacent ones of said load-transmitting portions are separated angularly by slots which are relatively shallow in relation to the radial thickness of said annular mass.

13. Shear-responsive force transducer apparatus as set forth in claim 11 wherein at least some of said adjacent ones of said load-transmitting portions are separated angularly by holes extending in axial directions substantially parallel with the central axis of said annular mass.

14. Shear-responsive force transducer apparatus as set forth in claim 1 wherein said direction of elongation is circular and said mass is annular, wherein said opposite directions are substantially in the axial directions, wherein said means for applying load forces comprises substantially rigid load-transmitting portions projecting in said axial directions, in force-transmitting relation to upper and lower portions of said annular mass, said load-transmitting portions each being of arcuate length less than that of said annular mass, and adjacent ones of the load transmitting portions along one of said upper and lower portions being spaced apart annularly by substantially the same angular expanse as that of the intermediate angularly offset load-transmitting portion along the other of said upper and lower portions.

15. Shear-responsive force transducer apparatus as set forth in claim 14 wherein said load-transmitting portions are disposed substantially radially, and wherein said gages are bonded to inner and outer peripheral surfaces of said annular mass in oblique relation to axially extending paths along which said shear sections are exposed.

16. Shear-responsive force transducer apparatus as set forth in claim 15 wherein adjacent ones of said load-transmitting portions are separated angularly by substantially radially extending slots which are shallow in relation to the axial thickness of said annular mass.

17. Shear-responsive force transducer apparatus comprising a substantially rigid and solid block of metal having a high modulus of elasticity and having substantially parallel flat sides, means for applying load forces to said block in opposite substantially parallel directions substantially parallel with said sides, said means including rigid projections extending upwardly and downwardly from upper and lower portions, respectively, of said block in a bifurcated force-transmitting arrangement wherein adjacent edges of two of said projections spaced along one of said portions are substantially in alignment with edges of a projection along the other of said portions, whereby forces applied in opposite directions to the upwardly and downwardly extending projections develop substantially pure shear in substantially parallel and relatively thin shear sensing portions of said block disposed substantially in alignment with said edges and normal to said sides, and at least one strain gage bonded to at least one of said sides of said block at each site therealong where each of said shear sensing portions is exposed.

18. Shear-responsive force transducer apparatus as set forth in claim 17 wherein the metal of said projections is integral with that of said block, wherein said gages include gages on both sides of said block at each of said sites disposed obliquely in relation to said directions of said forces, and wherein the sites at which said shear sensing portions are exposed are of greater dimension in direction parallel with said directions of said forces than the expanse in the same direction of said gages bonded at said sites, whereby said gages respond to substantially peaked shear effects at said sites.

19. Shear-responsive force transducer apparatus comprising a plurality of substantially rigid and solid elongated parallel bar elements of metal having a high modulus of elasticity and each having a substantially uniform width between substantially parallel flat sides thereof, each of said elements having a plurality of discrete rigid load-transmitting portions of the same height projecting upwardly and downwardly in alternation along upper and lower portions, respectively, of the bar, adjacent ones of said load-transmitting portions along one of said upper and lower portions being spaced apart by a distance substantially equal to the length of the intermediate laterally-offset load-transmitting portion along the other of said upper and lower portions of the bar, a pair of substantially rigid broad-area force-applying covers, means securing said covers in sandwiching relation to a side-by-side array of said parallel bar elements with the inner portions of said covers respectively contiguous with all the upwardly projecting and downwardly projecting load-transmitting portions of all of said bar elements, whereby forces applied in opposite directions to said covers develop substantially pure shear in substantially parallel and relatively thin shear sensing portions of said bar elements disposed substantially in alignment with adjacent edges of alternate load-transmitting portions thereof, and at least one strain gage bonded to at least one of said flat sides of each of said bar elements at each site therealong where each of said shear sensing portions is exposed.

20. Shear-responsive force transducer apparatus as set forth in claim 19 wherein said covers are substantially flat and coextensive with said side-by-side array of said bar elements, wherein at least one of said broad-area covers has an edge thickness reduced in relation to thickness of the remainder thereof, with the outer portions thereof at the location of the reduced thickness being disposed closer to said bar elements and, thereby, beyond the reach of force-applying members engaging the remainder of said outer portions, and wherein said securing means includes means fixing reduced-thickness edge portions of said covers with ends of said bar elements.

21. Shear-responsive force transducer apparatus as set forth in claim 20 wherein the reduced edge thickness at least in part has thinness imparting flexibility thereto and forming a flexure therealong.

22. Shear-responsive force transducer apparatus as set forth in claim 21 wherein each said flexure is of at least the same width as that of said bar elements.

23. Shear-responsive force transducer apparatus as set forth in claim 22 wherein each of said force-applying covers comprises a plurality of substantially rigid elongated parallel members each of width slightly in excess of the width of said bar elements and aligned therewith, wherein said securing means includes means securing said rigid members of each of said covers together in side-by-side relationship, and wherein at least one of each of the two rigid members associated respectively with the upper and lower portions of each of said bar elements has an opening therethrough near each end extending in direction transversely both to the direction of elongation of that member and the directions of said forces and thereby developing said thinness and flexure near each said end.

References Cited

UNITED STATES PATENTS

| | | | |
|---|---|---|---|
| 2,866,059 | 12/1958 | Laimins | 338—5 |
| 3,124,770 | 3/1964 | Ciavatta | 338—5 |
| 3,196,676 | 7/1965 | Pien | 338—4 |
| 3,335,381 | 8/1967 | Di Giovanni | 338—4 |
| 3,341,794 | 9/1967 | Stedman | 338—4 |
| 3,358,257 | 12/1967 | Painter et al. | 338—2 |

FOREIGN PATENTS 581,311 8/1959 Canada.

REUBEN EPSTEIN, *Primary Examiner.*

U.S. Cl. X.R.

338—2, 6